United States Patent
Yang

(10) Patent No.: US 11,899,710 B2
(45) Date of Patent: Feb. 13, 2024

(54) IMAGE RECOGNITION METHOD, ELECTRONIC DEVICE AND STORAGE MEDIUM

(71) Applicant: Beijing Baidu Netcom Science and Technology Co., LTD, Beijing (CN)

(72) Inventor: Min Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 306 days.

(21) Appl. No.: 17/360,535

(22) Filed: Jun. 28, 2021

(65) Prior Publication Data

US 2021/0326639 A1 Oct. 21, 2021

(30) Foreign Application Priority Data

Oct. 23, 2020 (CN) .......................... 202011148154.7

(51) Int. Cl.
*G06V 10/82* (2022.01)
*G06N 3/045* (2023.01)
*G06N 3/08* (2023.01)
*G06F 18/20* (2023.01)
*G06F 16/55* (2019.01)
(Continued)

(52) U.S. Cl.
CPC ............ *G06F 16/55* (2019.01); *G06F 18/214* (2023.01); *G06F 18/217* (2023.01); *G06F 18/24* (2023.01); *G06F 18/253* (2023.01); *G06N 3/045* (2023.01); *G06N 3/08* (2013.01); *G06V 10/454* (2022.01); *G06V 10/764* (2022.01); *G06V 10/774* (2022.01); *G06V 10/776* (2022.01); *G06V 10/809* (2022.01); *G06V 10/82* (2022.01); *G06V 20/00* (2022.01)

(58) Field of Classification Search
CPC ...... G06F 16/55; G06F 18/253; G06F 18/217; G06F 18/24; G06F 18/214; G06V 10/454; G06V 10/809; G06V 10/82; G06V 10/774; G06V 10/776; G06V 10/764; G06V 20/00; G06N 3/045; G06N 3/08
See application file for complete search history.

(56) References Cited

U.S. PATENT DOCUMENTS

2022/0270348 A1* 8/2022 Xu ..................... G06V 10/7715

OTHER PUBLICATIONS

Dec. 16, 2021—EESR—App. No. 21181128.6.
(Continued)

*Primary Examiner* — Nancy Bitar
*Assistant Examiner* — Dustin Bilodeau
(74) *Attorney, Agent, or Firm* — Banner & Witcoff, Ltd.

(57) ABSTRACT

An image recognition method, electronic device, and storage medium are provided and relate to the fields of artificial intelligence, computer vision, deep learning, image processing, and the like. The method includes: performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and inputting image data to be recognized into the target classification network to obtain a recognition result. By adopting the method, the accuracy of the image recognition may be improved.

9 Claims, 4 Drawing Sheets

(51) Int. Cl.
    *G06F 18/25*     (2023.01)
    *G06F 18/24*     (2023.01)
    *G06F 18/214*     (2023.01)
    *G06F 18/21*     (2023.01)
    *G06V 10/764*     (2022.01)
    *G06V 10/774*     (2022.01)
    *G06V 10/776*     (2022.01)
    *G06V 10/80*     (2022.01)
    *G06V 10/44*     (2022.01)
    *G06V 20/00*     (2022.01)

(56) References Cited

OTHER PUBLICATIONS

Md Alimoor Reza and David J. Crandall "IC-ChipNet: Deep Embedding Learning for Fine-grained Retrieval, Recognition, and Verification of Microelectronic Images", 2020 IEEE, Oct. 13, 2020, p. 1-10.

* cited by examiner

IMAGE RECOGNITION METHOD, ELECTRONIC DEVICE AND STORAGE MEDIUM

CROSS-REFERENCE TO RELATED APPLICATION

This application claims priority to Chinese patent application No. 202011148154.7, filed on Oct. 23, 2020, which is hereby incorporated by reference in its entirety.

TECHNICAL FIELD

The present disclosure relates to the field of artificial intelligence. The present disclosure relates particularly to the fields of computer vision, deep learning, image processing, and the like.

BACKGROUND

As electronic devices like portable devices and mobile phone terminals etc. are more intelligent than before, the parsing capabilities of chips are stronger, especially video information parsing, picture rendering, and the like are faster and clearer than before, resulting in a higher demand for the convenience and accuracy of image recognition.

SUMMARY

The present disclosure provides an image recognition method, apparatus, electronic device and storage medium.

According to an aspect of the present disclosure, there is provided an image recognition method, including:
  performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and
  inputting image data to be recognized into the target classification network to obtain a recognition result.

According to another aspect of the present disclosure, there is provided an image recognition apparatus, including:
  a training module configured for performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and
  a recognition module configured for inputting image data to be recognized into the target classification network to obtain a recognition result.

According to another aspect of the present disclosure, there is provided electronic device, including:
  at least one processor; and
  a memory communicatively connected to the at least one processor; wherein,
  the memory stores instructions executable by the at least one processor, and the instructions are executed by the at least one processor to enable the at least one processor to execute the method provided by any embodiment of the present disclosure.

According to another aspect of the present disclosure, there is provided a non-transitory computer-readable storage medium storing computer instructions, wherein the computer instructions are configured for causing a computer to execute the method provided by any embodiment of the present disclosure.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to better understand technical solution(s) of the present disclosure and should not be constructed a limitation to the present disclosure. Wherein.

DETAILED DESCRIPTION

Figure 1:
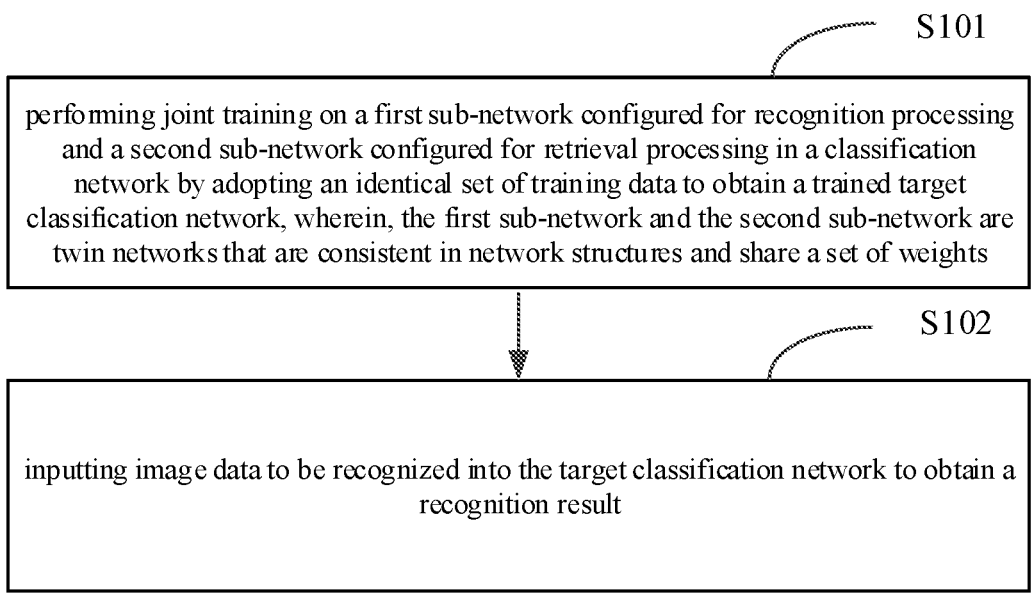
FIG. 1 is a schematic flow chart of an image recognition method according to an embodiment of the present disclosure.

The exemplary embodiments of the present disclosure will be described below in combination with the accompanying drawings, including various details of the embodiments of the present disclosure to facilitate understanding, which should be considered as exemplary only. Therefore, those skilled in the art should realize that various changes and modifications can be made to the embodiments described herein without departing from the scope and spirit of the present disclosure. Likewise, descriptions of well-known functions and structures are omitted in the following description for clarity and conciseness.

The term "and/or," as used herein, is merely an association relationship that describes an associated object, and means that there may be three relationships. For example, A and/or B may represent three cases of A existing alone, A and B existing simultaneously, and B existing alone. The term "at least one," as used herein, means any one of the plurality or any combination of at least two of the plurality, e.g., including at least one of A, B, and C, that may represent including any one or more elements selected from the group consisting of A, B, and C. The terms "first" and "second," as used herein, mean a plurality of similar technical terms and are used to distinguish among the plurality of similar technical terms, and are not meant to limit the order or to limit only two. For example, a first feature and a second feature mean two types of features/two features, wherein the first feature may be one or more, and the second feature may also be one or more.

Further, in the following specific implementations, numerous specific details are set forth in order to better describe the present disclosure. It will be understood by those skilled in the art that the present disclosure may be implemented without some of the specific details. In some instances, methods, means, elements and circuits well known to those skilled in the art will not be described in detail so as to highlight the subject matter(s) of the present disclosure.

Fine-grained recognition, as the name implies, is an accurate and fine sub-classification object distinguishing and recognition for a certain classification of objects. These sub-classifications are visually very similar objects, and thus are very challenging both for people and for algorithms, such as different species of birds, dogs, flowers, cars, and the like, and are generally difficult to be distinguished without corresponding professional knowledge. The fine-grained recognition is more complex and difficult than the general recognition analysis of an object, and has greater reference significance for the guidance of life and practice.

The two tasks of recognition and retrieval are complementary in many respects, and the recognition task can be completed by acquiring the corresponding object information from a retrieval result. The fine-grained field is also divided into fine-grained recognition and fine-grained retrieval. At present, research on these two fields is basically separate: the recognition task is to train classification network to perform better classification by digging various attention mechanisms, while the retrieval task is to train the distinguishing features with the method of metric learning. At present, the two tasks of recognition and retrieval are respectively trained. However, such a training method is solitary, and the correlation between them is not considered, resulting in the low accuracy of the image recognition. By adopting the present disclosure, the correlation between the two tasks of recognition and retrieval is considered, and twin networks can also be constructed on the basis of a paddlepaddle framework. The paddlepaddle serves as a deep learning framework and has good support for deep learning model development, so that the twin networks constructed on the basis of the paddlepaddle framework perform training in both manners of classification and feature learning together, improving the effect of the recognition or retrieval.

According to an embodiment of the present disclosure, there is provided an image recognition method. FIG. 1 is a schematic flow chart of an image recognition method according to an embodiment of the present disclosure. The method can be applied to an image recognition apparatus; for example, in a case that the apparatus can be deployed in a terminal or a server or other processing device, the apparatus can execute the joint training, image recognition, and the like based on training data. Among other things, the terminal may include user equipment (UE), a mobile device, a cellular phone, a cordless phone, a personal digital assistant (PDA), a handheld device, a computing device, a vehicle-mounted device, a wearable device, etc. In some possible implementations, the method may also be implemented by a processor which calls computer-readable instructions stored in the memory. As shown in FIG. 1, the method may include:

S101, performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights.

In an example, both the first sub-network and the second sub-network may be backbone networks, which may be convolution neural network (CNN)-based backbone networks that are primarily configured for feature extraction. A neural network that may perform the feature extraction is within the protection scope of the present disclosure.

The twin networks, which may also be referred to as a twinborn neural network, are a classification of neural network architectures comprising two or more identical sub-networks. In an example, the network structures of the first sub-network and the second sub-network are consistent and have identical configuration (i.e., have an identical network parameter and share a set of weights). The parameter adjustment of a network parameter during the joint training can be: commonly performing parameter updating on both the first sub-network and the second sub-network in order to find similarities of features or relationships between two comparable features in the two correlated tasks of recognition and retrieval to obtain more accurate classified feature(s).

S102, inputting image data to be recognized into the target classification network to obtain a recognition result.

In an example, the image data to be recognized may include a plurality of target objects, such as flowers, grasses, people, etc., that need to be recognized. The image data to be recognized is input into a target classification network, where features of flowers, grasses, people, and the like may be extracted respectively, and the features are classified in the first sub-network, feature comparison is performed on the features, in the first sub-network and the second sub-network, and required classified features are finally obtained by combining the feature classification and the feature comparison so as to obtain a recognition result based on the classified features, that is, flowers, grasses, people, and the like are recognized from the image data to be recognized.

In the fine-grained recognition processing, such as, recognition of flowers, grasses, and the like, if a single classification means is adopted, in the first aspect, it is taken as a general recognition classification to perform. The following content may be included.

For example, a model, such as SeNet, DenseNet, Res2Net, with an attention mechanism and a feature reuse mechanism may be used to perform training on big data collection to make a large number of image sample changes, to train one classification model and obtain a recognition result based on the classification model. Because during the training it is needed to rely on a large amount of data to obtain a relatively accurate effect of recognition, if the amount of data is small, the effect of recognition may not be ideal. As another example, for the training on the classification model, an attention mechanism may also be adopted, to cause a network to focus on an important area in an image sample by itself during the training, so that one mask image is generated. The mask image is multiplied with the image sample (in order to be capable of performing gradient back propagation) so that training is performed together to train the classification model and obtain a recognition result based on the classification model.

In the second aspect of adopting a single classification means, the fine-grained retrieval method is similar to the recognition method in terms of a model, both of which are developed on the basis of feature extraction, but in terms of the first aspect, completing the recognition task on the basis of the feature extraction, and in the second aspect, completing the retrieval task on the basis of the feature extraction. That is, the recognition task and the retrieval task may be understood to have a consistent backbone network, and may also use the attention mechanism. But classification headers after the feature extraction are different, namely: for the recognition task, performing the classification by using cross entropy loss after a normalized index (softmax) function, while for the retrieval task, performing the classification by using the features to directly calculate the contrast loss, triple loss, etc.

If the feature trained by adopting the above classification method is directly retrieved by adopting the above single classification means, the effect of recognition of the image data is poor; however, by using the training mode of retrieval to training the classification, the accuracy is not high as well. In other words, if the two correlated tasks are split to be trained separately without considering the correlation between the two tasks, the effect of recognition of the image data is low. Even if the model is trimmed by the feature learning method after the classification is trained, the effect of recognition cannot be remarkably improved as well, and the processing time is increased, leading to high time cost.

By adopting the present disclosure, a first sub-network configured for recognition processing and a second sub-network configured for retrieval processing in a classification network may be jointly trained by adopting an identical set of training data to obtain a trained target classification network. Wherein, the first sub-network and the second sub-network are twin networks that are consistent in network structures and share a set of weights. Image data to be recognized may be input into the target classification network to obtain a recognition result. Since the target classification network is obtained through the joint training on the first sub-network and the second sub-network, more accurate feature classification may be obtained. Therefore the accuracy of the image recognition may be improved based on the more accurate feature classification.

Figure 2:
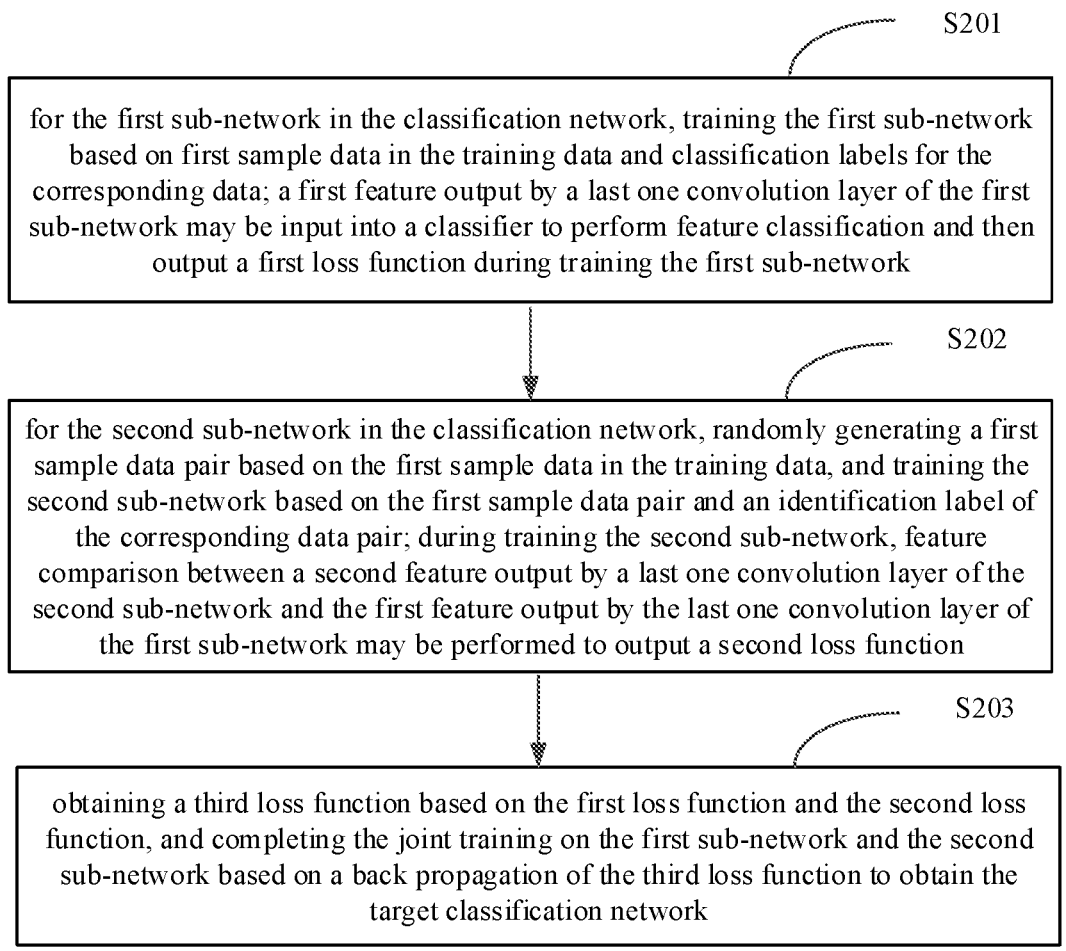
FIG. 2 is a schematic flow chart of network training for an image recognition method according to an embodiment of the present disclosure.

According to an embodiment of the present disclosure, there is provided an image recognition method. FIG. 2 is a schematic flow chart of an image recognition method according to an embodiment of the present disclosure. As shown in FIG. 2, the method may include:

S201, for the first sub-network in the classification network, training the first sub-network based on first sample data in the training data and classification labels for the corresponding data; a first feature output by a last one convolution layer of the first sub-network may be input into a classifier to perform feature classification and then output a first loss function during training the first sub-network.

In an example, the classification labels may be classification labels for distinguishing flowers, grasses, birds, people, cars, etc.

In an example, the first feature output by the last one convolution layer of the first sub-network may also be input into a classifier (e.g., a softmax classifier) to perform the feature classification and then perform cross entropy loss operation to obtain the first loss function. Wherein, the entropy denotes an uncertain metric of the random variables and is the expectation for the amount of information generated by all possible present events. The cross entropy is a common concept in deep learning, and is generally used to solve the difference between the target value (true distribution) and the predicted value (non-true distribution). The cross entropy may be used to evaluate the accuracy rate of the classification. The smaller the cross entropy is, the closer the difference between the target value (true distribution) and the predicted value (non-true distribution) is, and the more accurate the classification is.

S202, for the second sub-network in the classification network, randomly generating a first sample data pair based on the first sample data in the training data, and training the second sub-network based on the first sample data pair and an identification label of the corresponding data pair; during training the second sub-network, feature comparison between a second feature output by a last one convolution layer of the second sub-network and the first feature output by the last one convolution layer of the first sub-network may be performed to output a second loss function.

In an example, the first sample data pair may include a positive sample data pair and a negative sample data pair. Wherein, in a case that the two sample data pairs in the first sample data pair are of a same classification, the first sample data pair is a positive sample data pair; correspondingly, the identification label may be marked as a label 1. In a case that the two sample data pairs in the first sample data pair are of different classifications, the first sample data pair is the negative sample data pair; correspondingly, the identification label may be marked as a label 0. Because the second sub-network needs to perform feature comparison, a pair of sample data is needed. Namely the first sample data pair may include a positive sample data pair and a negative sample data pair, so that training is performed based on the positive sample data pair and the negative sample data pair, and a classification result with relatively excellent performance may be obtained. There may be an infinite number of first sample data in the training data, and the training data may cover various situations that may occur during an actual application.

S203, obtaining a third loss function based on the first loss function and the second loss function, and completing the joint training on the first sub-network and the second sub-network based on a back propagation of the third loss function to obtain the target classification network.

By adopting the present disclosure, for the identical set of training data, the joint training on recognition and retrieval is adopted to obtain a total loss function. Specifically, the identical set of training data is adopted to jointly train the first sub-network (recognition) and the second sub-network (retrieval) in twin networks configured for realizing recognition and retrieval, to obtain a trained target classification network. The first sub-network and the second sub-network constituting the target classification network are: twin networks that are consistent in network structures and share a set of weights. Wherein, the feature output by the last one convolution of the first sub-network is input into a softmax classifier, and the loss obtained after the cross entropy loss is recorded as "a first loss function"; the loss obtained after performing feature comparison between the feature output by the last one convolution of the second sub-network and the feature output by the last one convolution of the first sub-network is recorded as "a second loss function"; the total loss function obtained after summing the two loss functions of "the first loss function" and "the second loss function" is recorded as "the third loss function". The network parameter is adjusted by a back propagation of the third loss function, to complete the joint training on the first sub-network and the second sub-network until the network converges, so that the network training ends. The target classification network is obtained after training, so that the target classification network is applied to image processing fields such as image recognition, image retrieval, etc., which may significantly improve the accuracy of image recognition.

Figure 3:
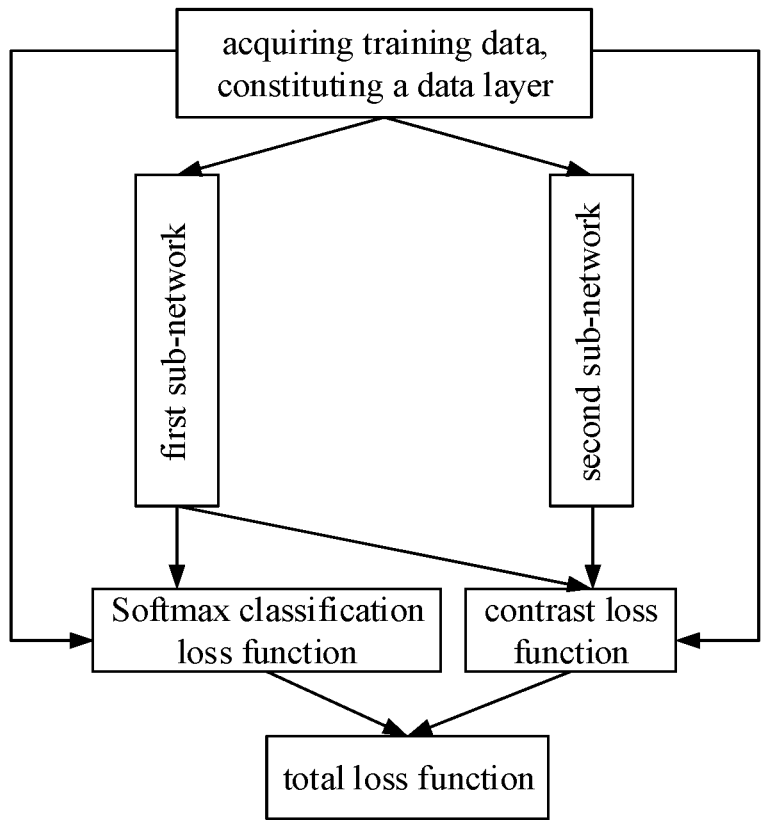
FIG. 3 is a schematic diagram of a classification network training process according to an embodiment of the present disclosure.

Examples of Applications:

Considering the correlation between recognition and retrieval, based on the paddlepaddle framework, twin networks are constructed. The classification loss function is applied to the first sub-network is and the contrast loss function is applied to the second sub-network, and the two sub-networks are trained together, to improve the effect of recognition or retrieval. FIG. 3 is a schematic diagram of a classification network training process according to an embodiment of the present disclosure. As shown in FIG. 3, the following contents may be included.

1. Acquiring Training Data Constituting a Data Layer

A data format required by the joint training on the first sub-network and the second sub-network may generated by using the classified labels. For example, all training data may be scrambled, each sample data randomly generating one sample data pair. The label may include at least two columns, the first column being the original classification label (primarily used in the training process of the first sub-network), and the second column being an identifier denoting whether the sample data pair is a positive sample data pair or a negative sample data pair, indicated by 0 and 1. The data format is as shown in Table 1 below.

TABLE 1

| Sample | Sample | Classification | P/N |
|---|---|---|---|
| Sample1_xxx.jpg | Sample2_xxx.jpg | 2 | 1 |
| Sample3_xxx.jpg | Sample4_xxx.jpg | 1 | 0 |

In Table 1, the first column "Classification": denotes the classification information corresponding to each sample data, and serves as a classification label; the second column "P/N": denotes an identification label of a sample data pair, for example, two samples "Sample1_xxx.jpg" and "Sample 2_xxx.jpg" in the first row are of the identical classification, the corresponding identification label is P, and P denotes the identification label of the positive sample data pair and is recorded as label "1"; for example, the two samples "Sample3_xxx.jpg" and "Sample 4_xxx.jpg" in the second row are of different classifications, the corresponding identification label is N, and N denotes the identification label of the negative sample data pair, and may be recorded as label "0".

2. Based on the twin networks constructed by the paddlepaddle framework, the classification loss function is applied to the first sub-network is and the contrast loss function is applied to the second sub-network, and the two sub-networks are trained together, and the first sub-network and the second sub-network adopt an identical network structure and configuration (sharing network parameters and sharing weights), both of which may adopt a backbone network (such as a resnet backbone network). The first feature of the last one convolution layer of the first sub-network is input into a softmax classifier and cross entropy loss operation is performed to obtain a softmax classification loss function; feature contrast loss operation is performed on the second feature of the last one convolution layer of the second sub-network and the first feature of the last one convolution layer of the first sub-network, to obtain a contrast loss function. The two losses of the softmax classification loss function and the contrast loss function are summed to obtain a total loss function, and back propagation is performed on the total loss function to realize the joint training on the first sub-network and the second sub-network.

By adopting the present application example, the fine-grained recognition and the fine-grained retrieval are combined so that the joint training on the twin networks is realized based on the paddlepaddle framework, the precision of the fine-grained recognition is effectively improved by performing one-time training, and the high-level features are more distinguishable, which may be directly expanded to the retrieval application with good application value.

Figure 4:
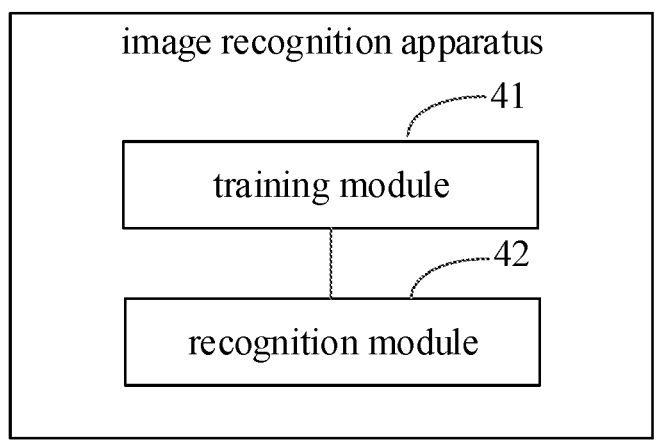
FIG. 4 is a schematic diagram showing a constitution structure of an image recognition apparatus according to an embodiment of the present disclosure.

According to an embodiment of the present disclosure, there is provided an image recognition apparatus. FIG. 4 is a schematic diagram showing a constitution structure of an image recognition apparatus according to an embodiment of the present disclosure. As shown in FIG. 4, the apparatus may include: a training module 41 configured for performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and a recognition module 42 configured for inputting image data to be recognized into the target classification network to obtain a recognition result.

In one implementation, the training module may include: a first training sub-module configured for, for the first sub-network, training the first sub-network based on first sample data in the training data and classification labels for the corresponding data; and a second training sub-module configured for, for the second sub-network, randomly generating a first sample data pair based on the first sample data in the training data, and training the second sub-network based on the first sample data pair and an identification label of the corresponding data pair.

In one implementation, the first sample data pair may include a positive sample data pair and a negative sample data pair; in a case that the two sample data pairs in the first sample data pair are of a same classification, the first sample data pair is the positive sample data pair; in a case that the two sample data pairs in the first sample data pair are of different classifications, the first sample data pair is the negative sample data pair.

In one implementation, the first training sub-module is further configured for inputting a first feature output by a last one convolution layer of the first sub-network into a classifier to perform feature classification and then output a first loss function during training the first sub-network.

In one implementation, the first training sub-module is further configured for inputting the first feature output by the last one convolution layer of the first sub-network into the classifier to perform the feature classification and then perform cross entropy loss operation to obtain the first loss function.

In one implementation, the second training sub-module is further configured for performing feature comparison between a second feature output by a last one convolution layer of the second sub-network and the first feature in terms of a feature to output a second loss function during training the second sub-network.

In one implementation, the apparatus may further include a back propagation module configured for obtaining a third loss function based on the first loss function and the second loss function; and completing the joint training on the first sub-network and the second sub-network based on a back propagation of the third loss function to obtain the target classification network.

The function of each module in each apparatus in the embodiment of the present disclosure may be referred to the corresponding description in the above-mentioned method, and will not be described in detail herein.

According to an embodiment of the present disclosure, the present disclosure also provides electronic device and a readable storage medium.

Figure 5:
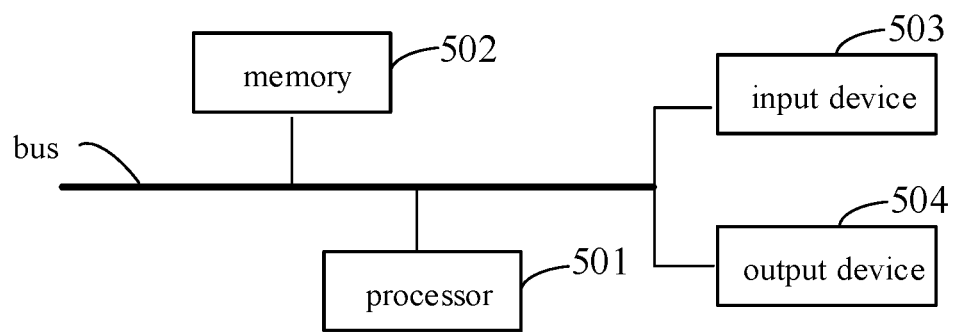
FIG. 5 is a block diagram of electronic device used to implement the image recognition method of an embodiment of the present disclosure.

As shown in FIG. 5, FIG. 5 is a block diagram of electronic device used to implement the image recognition method of an embodiment of the present disclosure. The electronic device may be deployment device or proxy device as described above. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital processing, cellular telephone, smart phone, wearable device, and other similar computing apparatuses. The parts, connections and relationships thereof, and functions thereof shown herein are merely examples and are not intended to limit the implementation of the present disclosure described and/or claimed herein.

As shown in FIG. 5, the electronic device may include: one or more processors 501, memory 502, and interfaces for connecting various parts, including a high-speed interface and a low-speed interface. The various parts are connected to each other using different buses and may be installed on a common motherboard or installed in other ways as needed. The processor may process instructions executed within electronic device, including instructions stored in the memory or on the memory to display graphical information of the GUI on an external input/output device, (such as display device coupled to an interface). In other implementations, a plurality of processors and/or a plurality of buses may be used with a plurality of memories, if desired. Similarly, a plurality of electronic devices may be connected, each device providing a part of necessary operations (e.g., as a server array, a group of blade servers or a multiprocessor system). In FIG. 5, one processor 501 is taken as an example.

The memory 502 is a non-transitory computer-readable storage medium provided by the present disclosure. Wherein, the memory stores instructions executable by at least one processor to cause the at least one processor to execute the image recognition method provided by the present disclosure. The non-transitory computer-readable storage medium of the present disclosure stores computer instructions for causing a computer to execute the image recognition method provided by the present disclosure.

The memory 502, as a non-transitory computer-readable storage medium, may be used to store non-transitory software programs, non-transitory computer-executable programs, and modules, such as program instructions/modules (e.g., the training module, the recognition module, and other modules, shown in FIG. 4) corresponding to the image recognition method in the embodiment of the present disclosure. The processor 501 executes various functional applications and data processing of the server, i.e., implementing the image recognition method in the above-described method embodiment, by executing non-transient software programs, instructions, and modules stored in the memory 502.

The memory 502 may include a storage program area and a storage data area; wherein the storage program area may store an operating system and an application program required by at least one function, and the storage data area may store data or the like created based on the usage of the electronic device. In addition, the memory 502 may include high speed random access memory, and may also include non-transitory memory, such as at least one magnetic disk storage component, a flash memory component, or other non-transitory solid state storage components. In some embodiments, the memory 502 optionally includes memories set remotely provided relative to the processor 501, and these remote memories may be connected to the electronic device via a network. Instances of the above network include, but are not limited to, the Internet, an intranet, a local area network, a mobile communication network, and combinations thereof.

The electronic device of the image recognition method may further include: an input device 503 and an output device 504. The processor 501, the memory 502, the input device 503, and the output device 504 may be connected by a bus or other means. In FIG. 5, the connection through a bus is taken as an example.

The input device 503, such as a touch screen, a keypad, a mouse, a trackpad, a touchpad, an indication rod, one or more mouse buttons, a trackball, a joystick, etc., may receive input numeric or character information, and generate key signal inputs related to user settings and functional control of the electronic equipment. The output device 504 may include display equipment, an auxiliary lighting device (e.g., an LED), a tactile feedback device (e.g., a vibration motor), etc. The display equipment may include, but is not limited to, a liquid crystal display (LCD), a light emitting diode (LED) display, and a plasma display. In some implementations, the display device may be a touch screen.

Various implementations of the system and technology described herein may be implemented in a digital electronic circuit system, an integrated circuit system, an application specific ASIC (application specific integrated circuit), computer hardware, firmware, software, and/or combination thereof. These various implementations may include: implementing in one or more computer programs, which may be executed and/or interpreted on a programmable system including at least one programmable processor. The programmable processor may be a dedicated or general-purpose programmable processor that may receive data and instructions from a storage system, at least one input device, and at least one output device, and transmit the data and instructions to the storage system, the at least one input device, and the at least one output device.

These computing programs (also referred to as program, software, software applications, or code) include machine instructions of a programmable processor, and these computer programs may be implemented using a high-level process and/or an object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including the machine-readable medium that receives machine instructions as machine-readable signals. The term "machine-readable signal" refers to any signal used to provide machine instructions and/or data to a programmable processor.

In order to provide the interaction with a user, the system and technology described herein may be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user may provide input to the computer. Other types of apparatus may also be used to provide the interaction with a user: for example, the feedback provided to the user may be any form of sensory feedback (e.g., visual feedback, auditory feedback, or tactile feedback); and input from the user may be received in any form (including acoustic input, voice input, or tactile input).

The system and technology described herein may be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user may interact with implementations of the system and technology described herein) that includes a front-end part, or be implemented in a computing system that includes any combination of such background part, middleware part, or front-end part. The parts of the system may be interconnected by any form or medium of the digital data communication (e.g., a communication network). Examples of the communication network include: a Local Area Networks (LAN), a Wide Area Network (WAN), and the Internet.

A computer system may include a client and a server. The client and server are typically remote from each other and typically interact through a communication network. The relationship of the client and the server is generated by computer programs running on respective computers and having a client-server relationship with each other.

By adopting the present disclosure, a first sub-network configured for recognition processing and a second sub-network configured for retrieval processing in a classification network may be jointly trained by adopting an identical set of training data to obtain a trained target classification network. Wherein, the first sub-network and the second sub-network are twin networks that are consistent in network structures and share a set of weights. Image data to be recognized may be input into the target classification network to obtain a recognition result. Since the target classification network is obtained through the joint training on the first sub-network and the second sub-network, more accurate feature classification may be obtained. Therefore the accuracy of the image recognition may be improved based on the more accurate feature classification.

It should be understood that various forms of processes shown above may be used to reorder, add, or delete steps. For example, respective steps recorded in the present disclosure may be executed in parallel, or may be executed sequentially, or may be executed in a different order, so long as the desired result of the technical solution provided in the present disclosure can be achieved, no limitation is made herein.

The above-mentioned specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement, and the like made within the spirit and principle of the present disclosure shall be included within the protection scope of the present disclosure.

What is claimed is:

1. An image recognition method, comprising:
   performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and
   inputting image data to be recognized into the target classification network to obtain a recognition result;
   wherein the performing joint training on the first sub-network configured for recognition processing and the second sub-network configured for retrieval processing in the classification network by adopting the identical set of training data comprises:
   for the first sub-network, training the first sub-network based on first sample data in the training data and classification labels for the corresponding data; and
   for the second sub-network, randomly generating a first sample data pair based on the first sample data in the training data, and training the second sub-network based on the first sample data pair and an identification label of the corresponding data pair;
   wherein the method further comprises:
   inputting a first feature output by a last one convolution layer of the first sub-network into a classifier to perform feature classification and then output a first loss function during training the first sub-network;
   performing feature comparison between a second feature output by a last one convolution layer of the second sub-network and the first feature to output a second loss function during training the second sub-network;
   obtaining a third loss function based on the first loss function and the second loss function; and
   completing the joint training on the first sub-network and the second sub-network based on a back propagation of the third loss function to obtain the target classification network.

2. The method of claim 1, wherein the first sample data pair comprises a positive sample data pair and a negative sample data pair;
   in a case that the two sample data pairs in the first sample data pair are of a same classification, the first sample data pair is the positive sample data pair;
   in a case that the two sample data pairs in the first sample data pair are of different classifications, the first sample data pair is the negative sample data pair.

3. The method of claim 1, wherein the inputting the first feature output by the last one convolution layer of the first sub-network into the classifier to perform the feature classification and then output the first loss function comprises:
   inputting the first feature output by the last one convolution layer of the first sub-network into the classifier to perform the feature classification and then perform cross entropy loss operation to obtain the first loss function.

4. An electronic device, comprising:
   at least one processor; and
   a memory communicatively connected to the at least one processor; wherein,
   the memory stores instructions executable by the at least one processor, and the instructions are executed by the at least one processor to enable the at least one processor to perform operations of:
   performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and inputting image data to be recognized into the target classification network to obtain a recognition result;

wherein the performing joint training on the first sub-network configured for recognition processing and the second sub-network configured for retrieval processing in the classification network by adopting the identical set of training data comprises:

for the first sub-network, training the first sub-network based on first sample data in the training data and classification labels for the corresponding data; and for the second sub-network, randomly generating a first sample data pair based on the first sample data in the training data, and training the second sub-network based on the first sample data pair and an identification label of the corresponding data pair wherein the instructions are executable by the at least one processor to enable the at least one processor to further perform an operation of:

inputting a first feature output by a last one convolution layer of the first sub-network into a classifier to perform feature classification and then output a first loss function during training the first sub-network performing feature comparison between a second feature output by a last one convolution layer of the second sub-network and the first feature to output a second loss function during training the second sub-network;

obtaining a third loss function based on the first loss function and the second loss function; and completing the joint training on the first sub-network and the second sub-network based on a back propagation of the third loss function to obtain the target classification network.

5. The electronic device of claim 4, wherein the first sample data pair comprises a positive sample data pair and a negative sample data pair;

in a case that the two sample data pairs in the first sample data pair are of a same classification, the first sample data pair is the positive sample data pair;

in a case that the two sample data pairs in the first sample data pair are of different classifications, the first sample data pair is the negative sample data pair.

6. The electronic device of claim 4, wherein the inputting the first feature output by the last one convolution layer of the first sub-network into the classifier to perform the feature classification and then output the first loss function comprises:

inputting the first feature output by the last one convolution layer of the first sub-network into the classifier to perform the feature classification and then perform cross entropy loss operation to obtain the first loss function.

7. A non-transitory computer-readable storage medium storing computer instructions; wherein the computer instructions are configured for causing a computer to perform operations of:

performing joint training on a first sub-network configured for recognition processing and a second sub-network configured for retrieval processing in a classification network by adopting an identical set of training data to obtain a trained target classification network, wherein, the first sub-network and the second sub-network are twin networks that are consistent in network structures and share a set of weights; and inputting image data to be recognized into the target classification network to obtain a recognition result;

wherein the performing joint training on the first sub-network configured for recognition processing and the second sub-network configured for retrieval processing in the classification network by adopting the identical set of training data comprises:

for the first sub-network, training the first sub-network based on first sample data in the training data and classification labels for the corresponding data; and for the second sub-network, randomly generating a first sample data pair based on the first sample data in the training data, and training the second sub-network based on the first sample data pair and an identification label of the corresponding data pair;

wherein, the computer instructions are further configured for causing computer to perform an operation of:

inputting a first feature output by a last one convolution layer of the first sub-network into a classifier to perform feature classification and then output a first loss function during training the first sub-network;

performing feature comparison between a second feature output by a last one convolution layer of the second sub-network and the first feature to output a second loss function during training the second sub-network obtaining a third loss function based on the first loss function and the second loss function; and completing the joint training on the first sub-network and the second sub-network based on a back propagation of the third loss function to obtain the target classification network.

8. The non-transitory computer-readable storage medium of claim 7, wherein the first sample data pair comprises a positive sample data pair and a negative sample data pair;

in a case that the two sample data pairs in the first sample data pair are of a same classification, the first sample data pair is the positive sample data pair;

in a case that the two sample data pairs in the first sample data pair are of different classifications, the first sample data pair is the negative sample data pair.

9. The non-transitory computer-readable storage medium of claim 7, wherein the inputting the first feature output by the last one convolution layer of the first sub-network into the classifier to perform the feature classification and then output the first loss function comprises:

inputting the first feature output by the last one convolution layer of the first sub-network into the classifier to perform the feature classification and then perform cross entropy loss operation to obtain the first loss function.

\* \* \* \* \*